US011838277B2

(12) United States Patent
Lundgren et al.

(10) Patent No.: US 11,838,277 B2
(45) Date of Patent: Dec. 5, 2023

(54) BLOCKCHAIN-BASED SECURE, ANONYMIZING MESSAGE BUS

(71) Applicant: Ocelot Technologies, Inc., Seattle, WA (US)

(72) Inventors: Lon C. Lundgren, Seattle, WA (US); Eric A. Kearns, Seattle, WA (US)

(73) Assignee: Ocelot Technologies, Inc., Seattle, WA (US)

( * ) Notice: Subject to any disclaimer, the term of this patent is extended or adjusted under 35 U.S.C. 154(b) by 0 days.

(21) Appl. No.: 17/515,134

(22) Filed: Oct. 29, 2021

(65) Prior Publication Data
US 2022/0141198 A1 May 5, 2022

Related U.S. Application Data

(60) Provisional application No. 63/107,407, filed on Oct. 29, 2020.

(51) Int. Cl.
*H04L 9/40* (2022.01)
*H04L 9/06* (2006.01)
*H04L 9/32* (2006.01)
*H04L 9/00* (2022.01)

(52) U.S. Cl.
CPC ........ *H04L 63/0421* (2013.01); *H04L 9/0631* (2013.01); *H04L 9/3236* (2013.01); *H04L 9/3249* (2013.01); *H04L 63/045* (2013.01); *H04L 63/30* (2013.01); *H04L 9/50* (2022.05); *H04L 2209/42* (2013.01)

(58) Field of Classification Search
CPC . H04L 63/0421; H04L 9/0631; H04L 9/3236; H04L 9/3249; H04L 63/045; H04L 63/30; H04L 9/50; H04L 2209/42; H04L 9/3247; H04L 63/12
See application file for complete search history.

(56) References Cited

U.S. PATENT DOCUMENTS

| | | | |
|---|---|---|---|
| 10,728,283 B1 | 7/2020 | Dobrek et al. | |
| 10,805,085 B1 | 10/2020 | Liang | |
| 11,164,254 B1 * | 11/2021 | Gordon, III | G06Q 20/0658 |
| 11,349,926 B1 * | 5/2022 | Wang | H04L 63/12 |
| 2019/0319928 A1 | 10/2019 | Nesbit | |
| 2019/0320006 A1 * | 10/2019 | Allen | H04L 65/80 |
| 2019/0333059 A1 | 10/2019 | Fallah et al. | |
| 2020/0035059 A1 | 1/2020 | Campero et al. | |
| 2020/0143337 A1 * | 5/2020 | Conroy | G06Q 40/12 |
| 2020/0280444 A1 | 9/2020 | Tang et al. | |
| 2020/0327254 A1 * | 10/2020 | Abilash | H04L 9/3218 |
| 2020/0380475 A1 * | 12/2020 | Krueger | G06Q 20/065 |
| 2021/0019849 A1 * | 1/2021 | Qian | G06F 9/547 |
| 2021/0042741 A1 * | 2/2021 | Lu | G06F 21/602 |
| 2021/0058233 A1 * | 2/2021 | Lee | H04L 9/3239 |

(Continued)

*Primary Examiner* — Abu S Sholeman
(74) *Attorney, Agent, or Firm* — Seed IP Law Group LLP

(57) ABSTRACT

Systems and methods for enabling a blockchain-based secure, anonymizing message bus are disclosed. An example method includes sharing public keys associated with messaging participants for communicating information using a message-bus smart contract implemented on a blockchain network. The method also includes a first participant sending a message via a smart contract call against an instance of the message-bus smart contract, and a second participant determining and receiving the message using the blockchain network.

20 Claims, 12 Drawing Sheets

(56) References Cited

U.S. PATENT DOCUMENTS

| | | | |
|---|---|---|---|
| 2021/0058353 A1* | 2/2021 | Creech | H04L 51/212 |
| 2021/0224249 A1* | 7/2021 | Jing | G06F 16/2365 |
| 2021/0342803 A1* | 11/2021 | Yoo | G06Q 20/3825 |
| 2021/0382620 A1* | 12/2021 | Fang | H04L 9/3218 |

\* cited by examiner

① Machine Type Windows  ② Location Portland  ③ Payment BRNR 1.00

Confirm

Enter the seed phrase for your Burner Token below.

| about | spare | tattoo | | |

2/12

SUBMIT

What's this?

If you got a physical Burner Token from the team (or a digital one via email), enter the seed phrase here. Please do not enter your MetaMask or other wallet seed phrase!

FIG. 5

Confirm

Enter the seed phrase for your Burner Token below.

| about | spare | taste | surge | record |
| shop | cotton | pull | image | domain |
| picnic | master |

12/12

✓ Entered seed phrase holds a valid Burner Token.

SUBMIT

What's this?
If you got a physical Burner Token from the team (or a digital one via email), enter the seed phrase here. Please do not enter your MetaMask or other wallet seed phrase!

FIG. 6

BLOCKCHAIN-BASED SECURE, ANONYMIZING MESSAGE BUS

BACKGROUND

Technical Field

The present disclosure relates to blockchain and decentralized ledger technology and, in particular, relates to methods and systems that use blockchain and decentralized ledger technology to enable a decentralized web browser execution context and an anonymizing message bus.

Description of the Related Art

Currently, an emerging paradigm for application development, is called "decentralized application development." Decentralized application development enables the creation of applications and services that eschew dependencies on centralized providers for application code and data storage hosting and delivery. These decentralized applications, or dApps, depend instead upon nascent, but fast evolving, decentralized ledger and blockchain technologies, whereby application code, and the data results of user interactions with that code, are stored as a series of immutable transactions that are securely written within blocks that are cryptographically appended to an immutable ledger.

While not a strict requirement, most dApps are delivered as client-side web applications that run within a browser execution context. These client-side application bundles can be served to a browser in a variety of ways, but once they are loaded into a local browser context and sandbox, they typically have no external dependencies, other than the mechanism they utilize to interface with the blockchain that executes the application's code and houses the application's data.

Interacting with application code stored on a blockchain means submitting a "smart contract call" transaction and requires control of cryptographic key material for signing the transaction. Also required is access to cryptocurrency funds to pay the "gas" fees necessary to have the transaction appended into a block on the blockchain. For dApps that are delivered as client-side web applications, they further require the user to install a browser extension or plug-in, that is capable of maintaining a user "wallet." The user "wallet" must be able to securely hold a user's cryptocurrency funds, and submit a "smart contract call" transaction on the application's behalf, where the fee for the transaction is paid from the user's wallet.

Asking a user to install a browser extension or plug-in is an impediment to the ease-of-use and adoption of both decentralized applications and blockchain technology. Requiring a user to obtain cryptocurrency funds in order to pay "gas" fees is a further impediment that creates an artificial barrier to entry that also erodes the generally free, freemium, and free-to-play blockchain environment. This necessity can be engineered out of a decentralized application by adopting a "meta-transaction" model, whereby a transaction is created locally in the browser, and then submitted to a blockchain via a 3rd-party "relayer" who pays the "gas" fees on the user's behalf. However, this "meta-transaction" model means having to take a dependency against a "centralized" service provider that can furnish relayer-like services to the dApp or having to run additional application infrastructure to host "relayer" capabilities directly. Either choice results in the erosion of the trustless properties conferred by adopting a more pure usage of blockchain technology, on top of introducing an additional failure point into the dApp's architecture.

Therefore, bypassing the need for this plug-in would enable a much simpler user experience and effectively lower the barrier to entry for blockchain applications. As a result more applications would be smart contract call compatible. Accordingly, it is desirable to overcome such shortcomings of conventional systems, and to overcome limitations brought about by the need for the plug-in described above.

BRIEF SUMMARY

Systems and methods are provided in which a web browser or other network-based browsing application (hereinafter "browser") derives its own public/private keypair and Ethereum address (or address on other smart contract blockchain). Upon being sent a token, the browser is capable of making smart contract calls and autonomously interacting with the blockchain. In some embodiments, a way to kick-start this mechanism is to display a QR-code and address (corresponding to the browser's own address) to the user of the browser application, and have a user (or another machine) send a token to this address.

In some embodiments, a browser generates its own cryptographic seed from which it can derive one or more public-key cryptographic keypairs, and a user can fund the browser with crypto via QR-code or other one-time or periodic funding operation. The browser can be pre-funded, or can retrieve its own funding from some centralized allowance-distributor. This funding process only needs to be done once per a specified or arbitrary number of actions the browser takes.

In one or more embodiments, a user can delegate authority to the browser via QR-code or other one-time or periodic delegation operation. For example, a user's crypto currency wallet can provide the browser a signed claim, which can unify one or many individual browser seeds, trees, or ephemeral identities under a single long-lived user identity.

In some embodiments, the browser can use one or many of its keypairs to perform vanilla cryptographic operations such as signing and encrypting without user interaction; the browser can use one or many of its keypairs to transact on the blockchain without user interaction.

In some embodiments, a method for secure, anonymized messaging via a blockchain network that implements a message-bus smart contract is disclosed. The method includes: sharing, by each messaging participant of a plurality of messaging participants, one or more public keys associated with the messaging participant, for communicating information using the message-bus smart contract; anonymously sending, by a first messaging participant of the plurality of messaging participants, a message via a smart contract call against one of a plurality of instances of the message-bus smart contract that execute on the blockchain network; and determining and anonymously receiving, by a second participant of the plurality of messaging participants, the message using the blockchain network.

In some embodiments of the method for secure, anonymized messaging via a blockchain network that implements a message-bus smart contract, individual instances of the plurality of instances of the message-bus smart contract are uniquely addressable on the blockchain network. In other embodiments, sharing the one or more public keys associated with the messaging participant comprises publishing to the message-bus smart contract an association between a masquerade identity of the messaging participant and the one or more public keys. In still other embodiments, the masquerade identity of the messaging participant is derived based, at least in part, on a root cryptographic identity of the messaging participant on the blockchain. In yet other embodiments, the smart contract call indicates a masquerade identity of the second participant and includes a message payload.

Additionally, in other embodiments, the message payload is encrypted based, at least in part, on a public key of the second participant and a private key of the first participant. In still other embodiments, sending the message via the smart contract call comprises sending the message to an audience or topic published to the message-bus smart contract and wherein the smart contract call indicates one or more masquerade identities associated with the audience or topic. In yet other embodiments, determining and receiving the message using the blockchain network comprises polling the blockchain network for transactions against the message-bus smart contract since the second messaging participant was last updated and filtering the transactions based, at least in part, on a masquerade identity of the second participant.

In one or more other embodiments, a system includes: one or more processors; and a memory device storing instructions thereon that when executed by the one or more processors, cause one or more of the one or more processors to perform actions. In some embodiments, the actions include: sharing, by a recipient of a plurality of messaging participants, one or more public keys associated with the recipient, for communicating information using a message-bus smart contract implemented on a blockchain network; and determining and anonymously receiving, by the recipient and using the blockchain network, a message sent by a sender of the plurality of messaging participants via a smart contract call against one of a plurality of instances of the message-bus smart contract that execute on the blockchain network.

In some embodiments of the system, sharing the one or more public keys associated with the recipient comprises publishing to the message-bus smart contract an association between a masquerade identity of the recipient and the one or more public keys. In other embodiments of the system, the masquerade identity of the recipient is derived based, at least in part, on a root cryptographic identity of the recipient on the blockchain. In still other embodiments of the system, the smart contract call indicates a masquerade identity of the recipient and includes a message payload. In still other embodiments of the system, the message payload is encrypted based, at least in part, on a public key of the recipient and a private key of the sender. In yet other embodiments of the system, the message is retained through a distributed ledger operated by the blockchain network wherein the actions further comprise enabling, at least partially, the sender to anonymously direct the message to the recipient via the smart contract call. Additionally, in other embodiments of the system, determining and receiving the message using the blockchain network comprises monitoring the blockchain network in real-time for transactions against the message-bus smart contract based, at least in part, on a masquerade identity of the recipient.

In one or more other embodiments, a non-transitory computer-readable medium stores contents that, when executed by one or more processors, cause the one or more processors to perform actions. In some embodiments, the actions include: sharing, by a recipient of a plurality of messaging participants, one or more public keys associated with the recipient, for communicating information using a message-bus smart contract implemented on a blockchain network; and determining and anonymously receiving, by the recipient and using the blockchain network, a message sent by a sender of the plurality of messaging participants via a smart contract call against one of a plurality of instances of the message-bus smart contract that execute on the blockchain network.

In some embodiments of the computer-readable medium, sharing the one or more public keys associated with the recipient comprises publishing to the message-bus smart contract an association between a masquerade identity of the recipient and the one or more public keys. In other embodiments of the computer-readable medium, the smart contract call indicates a set of masquerade identities including the masquerade identity of the recipient. In still other embodiments of the computer-readable medium, determining and receiving the message using the blockchain network comprises polling the blockchain network for transactions against the message-bus smart contract. In yet other embodiments of the computer-readable medium, the determining and receiving the message using the blockchain network further comprises filtering the transactions based on one or more masquerade identities of an audience or topic published to the message-bus smart contract.

In one or more embodiments, a browser-based enhancement for smart contract call method is disclosed in which a browser redeems a token without any dependencies from a burner machine launch platform using blockchain. The method includes: receiving a request for a burner machine, the request including a type of burner machine; receiving a request for a burner machine location; receiving a seed phrase from a first browser to derive a private key; enabling the private key to access a token that is associated with the seed phrase; enabling the first browser to make a smart contract call by redeeming the token; and enabling the first browser to create ephemeral RSA keys that are used to encrypt information communicated between the browser and the burner machine launch platform; wherein the burner machine launch platform sends communications to the first browser that are only directed to the first browser, are encrypted, and can only by decrypted by the ephemeral RSA keys of the first browser; and wherein the burner machine launch platform launches a burner machine for the first browser.

In some embodiments, the burner machine launch transaction takes place between the first browser and the burner machine launch platform without the burner machine launch platform ever knowing any identifying information associated with the first browser. In another aspect of some embodiments, a burner machine launch transaction takes place between the first browser and the burner machine launch platform without any exchange of IP addresses. In still another aspect of some embodiments, the burner machine launch platform sends back an opaque blob through the blockchain to the first browser. In yet another aspect of some embodiments, the burner machine launch platform sends back an opaque blob that is encrypted with a key that is only possessed by the first browser. In other embodiments, the burner machine is launched by the first browser through a connection in the opaque blob.

In some embodiments, the method further includes: receiving cryptographic funds from the first browser for launching the burner machine. In another aspect of some embodiments, the burner machine may be launched at any of a plurality of locations around the world. In still another aspect of some embodiments, the burner machine self terminates after a set period of time. In yet another aspect of some embodiments, the burner machine is disposable and all actions performed on the burner machine are anonymous.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been selected solely for ease of recognition in the drawings.

FIG. 5 is a screen shot of an anonymous burner machine launch page with a seed phrase entry in progress, according to the invention as described herein.

FIG. 6 is a screen shot of an anonymous burner machine launch page with a seed phrase entry being submitted, according to the invention as described herein.

DETAILED DESCRIPTION

Figure 1:
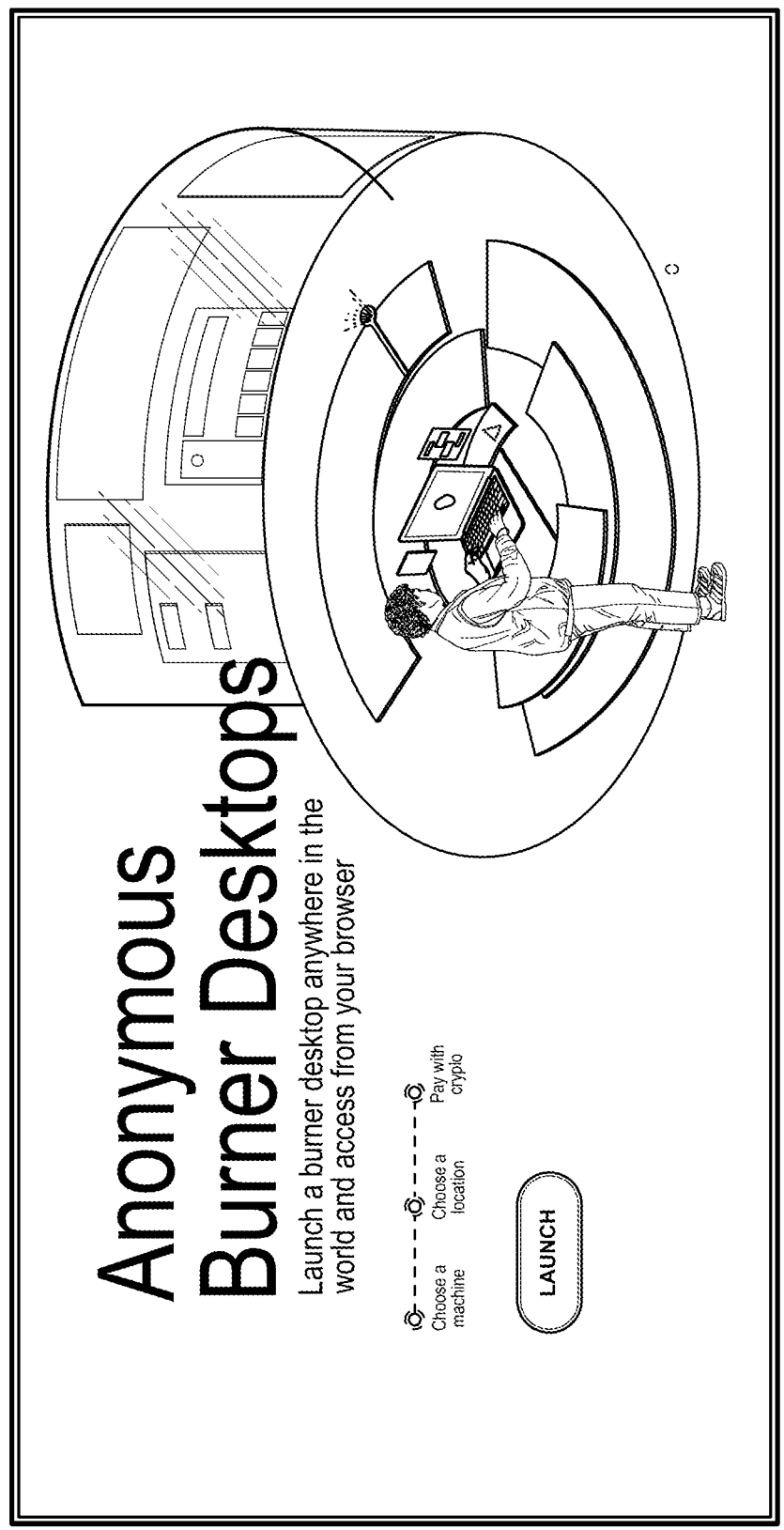
FIG. 1 is a screen shot of an anonymous burner machine launch page, according to the invention as described herein.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, un-recited elements or method acts).

Reference throughout this specification to "one embodiment," "an embodiment," or "some embodiments" means that a particular feature, structure or characteristic described in connection with the embodiment is included in at least one embodiment. Thus, the appearances of the phrases "in one embodiment," "in an embodiment," or "in some embodiments" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise. The headings and Abstract of the Disclosure provided herein are for convenience only and do not limit the scope or meaning of the embodiments.

Referring now to FIGS. 1-12, one or more embodiments of the presently disclosed technology are described. One aspect of this technology enables deterministic, verifiable, and trustless execution of immutable application logic encoded as "smart contracts", along with the storage and retrieval of immutable application data, all with the imbued properties of redundancy and high-availability. Usage of this technology can rely upon an application delivery mechanism which is usually constructed around a client-side application bundle run within a web browser execution context.

The browser-based enhancement for smart contract call system and method bypasses a decentralized application's dependency on a browser extension or plug-in in order to interact with application code and data on the blockchain. This is a significant technological improvement for developers and enables an increased adoption as dApps, which are then able to operate more like conventional web applications, and with comparable levels of ease-of-use.

Similarly, the browser-based enhancement for smart contract call system and method provides an alternative mechanism for a decentralized application to pay the "gas" fees associated with its use, and on behalf of its users. Additionally, the browser-based enhancement for smart contract call system and method also removes the need to introduce an external "relayer" dependency to realize equivalent benefits for ease-of-use and adoption. To achieve these goals, the browser-based enhancement for smart contract call system and method natively solves these two requirements from within the client-side application code running within the browser itself.

In one or more embodiments, the browser-based enhancement for smart contract call system and method operates on an autonomous cloud infrastructure substrate that exploits the cloud as a resource utility. The autonomous cloud infrastructure substrate provides access a global pool of cloud resources, eliminates dependencies across dozens of managed services, and has no centralized back end or dependencies other than communicating with the blockchain.

Figure 9:
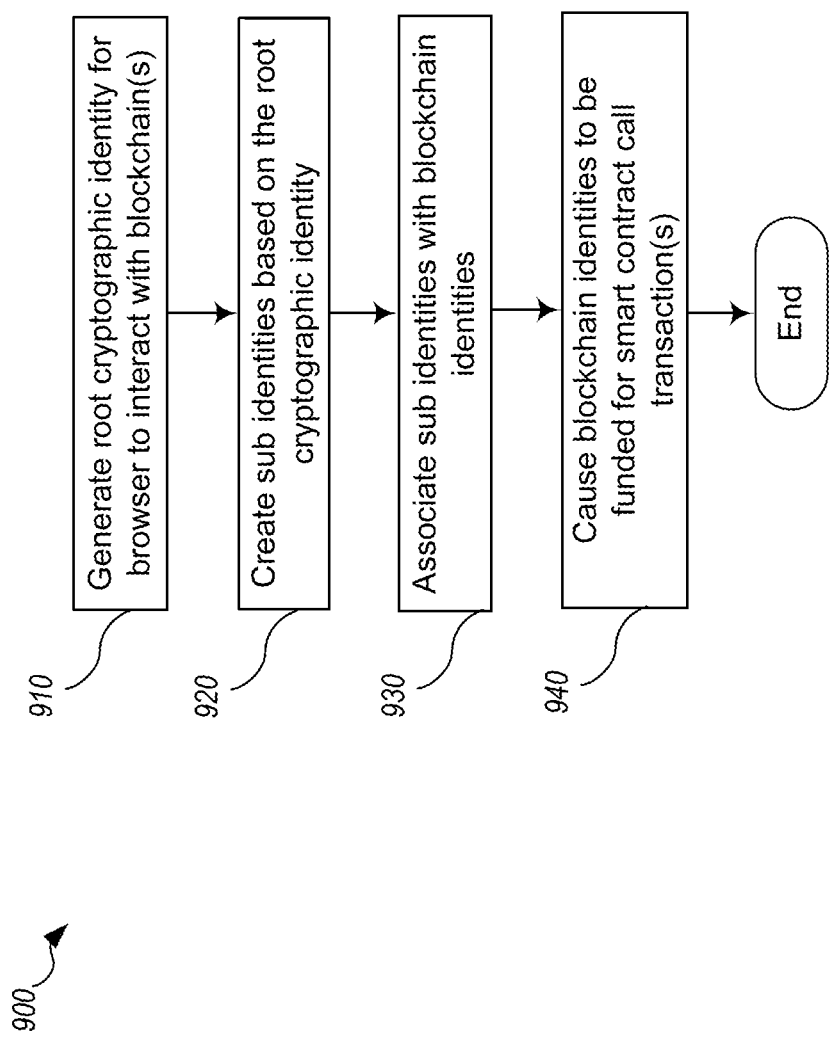
FIG. 9 is a flow chart illustrating an example method for browser-based smart contract call in accordance with some embodiments.

FIG. 9 is a flow chart illustrating an example method 900 for browser-based smart contract call in accordance with some embodiments. The method can be performed, at least in part, by a browser or an execution context (e.g., a web application) including a browser, that is executing on a client computing device communicatively connected with one or more blockchain networks.

At block 910, the method 900 includes generating a root cryptographic identity for the browser to interact with one or more blockchains. In some embodiments, an autonomous process running in the browser or browser execution context (hereinafter "browser actor") can securely and non-interactively (e.g., without user interaction) generate a root cryptographic identity, e.g., in the form of a 256-bit random number "private key." The root identity can be used ephemerally across a single browser session or stored securely in the browser to be continuously used across future browser sessions. The root identity can also be imported and exported from the browser, e.g., in a "seed" form of a 12-word or 24-word string of words, for portability between browsers or otherwise across browser environments and devices.

At block 920, the method 900 includes creating one or more sub identities based on the root identity. For example, the root cryptographic identity can autonomously create a hierarchy of sub identities, e.g., in the form of RSA keys for asymmetric encryption, AES keys for symmetric encryption, and ECDSA keys for blockchain address generation and digital signature. In some embodiments, different sub identities can have their own distinct set of RSA, AES, and ECDSA keys. The hierarchy of cryptographic material can be rederived at any time utilizing the root cryptographic identity and a specific hashing algorithm, and cannot be derived without access to the root identity's private key.

At block 930, the method 900 includes associating one or more sub identities with one or more blockchain identities. In some embodiments, blockchain identities are blockchain addresses created from ECDSA keys to uniquely identify the browser actor to other blockchain and non-blockchain entities across one or more blockchain platforms. Blockchain identities can autonomously operate on blockchain networks, receiving, holding, and transferring funds, and non-interactively submitting smart contract calls to a blockchain network or listening for blockchain event messages as a trigger for taking further action.

At block 940, the method 900 includes causing the one or more blockchain identities to be funded for smart contract call transaction(s). Blockchain identities that interact with blockchain smart contracts can utilize their own cryptocurrency balances to execute smart contract call transactions and associated payments of blockchain network "gas" fees. A blockchain identity can be non-interactively funded via an external process such as a smart contract allowance mechanism, a remote browser actor process sending funds in a peer-to-peer fashion, or by an external web application component that interacts with the browser actor. A blockchain identity can also be funded interactively by displaying, via the browser, a QR-code encoding the blockchain identity or the blockchain identity's public key to a user, and thereby causing the user to fund the blockchain identity.

In various embodiments, the browser actor can expose APIs and status information for use in a consuming browser application that allows a browser application process to orchestrate actions of the browser actor. These APIs can provide command-and-control capabilities and status information for the root identity, sub identities, associated RSA, AES, ECDSA keys, blockchain addresses, blockchain transaction statuses, and cryptocurrency balances.

As described above, this aspect of the technology dramatically enhances the ease-of-use of, and lowers the barrier of entry for, decentralized applications that rely upon decentralized ledger and blockchain technology for their operation. It eradicates the need for a user to install a custom browser extension, or plug-in, in order to submit smart contract call transactions. And it provides alternatives for the payment of blockchain network "gas" fees on behalf of users, without requiring the use of an external "meta-transaction relayer" or other external payment mechanism.

A use case example in accordance with this aspect of the technology is described as follows. In some currently disclosed embodiments of the browser-based enhancement for smart contract call system and method, a client-side library is utilized by a dApp that has been delivered to the end-user as a web application running within a browser execution context. This client-side library first looks in the browser's local storage to see if it has previously been initialized and if it holds cryptographic key material corresponding to the blockchain address it will use to submit "smart contract call" transactions and to pay network "gas" fees on the user's behalf when submitting those transactions.

If the library is unable to locate the cryptographic key material, it will automatically derive a new cryptographic key-pair and store it in the browser's local storage in an encrypted form, or it will use the browser's built-in cryptographic primitive support to securely store the key-pair, if available.

Once the library has access to, and control of, a usable cryptographic key-pair, and its corresponding blockchain address, it can be funded with cryptocurrency to allow it to be utilized from within the decentralized application, and so that the dApp can autonomously submit "smart contract call" transactions, and pay network "gas" fees associated with those transactions, without further user intervention or payment.

To fund the blockchain address with cryptocurrency, the library exposes a mechanism to display the address and a visual QR-code encoding of the address, and can be further augmented with instructions on how to send funds to the address. These funds can be sent by the user directly, by using a cryptocurrency wallet of their choosing, typically by scanning the QR-code from the device that controls the wallet. The source of the funds does not need to know anything about how the funds will be used, and does not need to have the capability to submit a "smart contract call" transaction itself. The source of the funds only needs to be able to transfer funds from itself to the supplied destination address. The blockchain address can also be funded autonomously via an external process, such as a component of the dApp that can provide the user with initial funds enabling interaction with the dApp for free. Alternatively, a remote instance of the dApp owned by an existing user, can transparently supply a new user's dApp instance with funds in a peer-to-peer fashion, and without any intervention required by either party.

When this mechanism is being used to (1) fund a single specific "smart contract call" transaction, the library can further display the exact-calculated cryptocurrency amount required, including any costs associated with the "smart contract call" itself (which can be an arbitrary application-provided value, or zero, depending on the application use-case), and to (2) pay the "gas" fees associated with the submission of the transaction to the blockchain. This calculation automatically takes into account the dynamic nature of gas prices on the blockchain network and also derives exact "gas" costs based upon the specific "smart contract call" being made, by cataloging the blockchain's virtual-machine-based op-codes that make up the call's logic, and accumulating each op-code's associated gas costs.

The library provides real-time monitoring and feedback of the cryptocurrency balance held by the address it controls, pending "receive" transactions when receiving new/additional cryptocurrency funds, and status and progress of pending "smart contract call" transactions that the library is responsible for submitting to the blockchain on behalf of the dApp. In addition, the library enables the dApp to elect to solicit funds and submit transactions in an ad-hoc or one-by-one manner as previously described. The library can also enable aggregate transaction submissions together, by enabling the dApp to build up a body of pending transaction work, and a total amount of cryptocurrency funds required to submit all transactions simultaneously.

Last, the library can be configured to return any excess cryptocurrency funds back to the original funding account automatically, or the funds can be maintained within the dApp for future use. For maximum future portability, the library can also export a "seed phrase" corresponding to the cryptographic key material it controls so that this "seed phrase" can later be used to import the cryptographic key material into a new browser or a new device, and to restore access to funds previously held by the mechanism.

Typically, simple dApps do not require server-side logic; they may consist of client-side logic served as a "single-page dApp" and blockchain-side code logic can be stored as a smart contract on the blockchain. More complex dApps may require server-side processes that perform work in response to user interactions that are made with the application or service. Presently, most dApps that have such a requirement fall back to a more traditional application architecture wherein the client interacts directly with a server.

In many cases, a scheme where a message sender interacts directly with the message recipient requires the sender to be able to reliably determine the network location or address of the recipient using traditional name registry services such as DNS, ENS, or the like. Traditional name registry services, while distributed in some cases, still have points of centralization in both technical implementation and structural governance. Decentralized name registry services, such as ENS, may be cost-prohibitive or unsuitable for services whose servers are ephemeral or routinely change hosting context or IP address.

Figure 10:
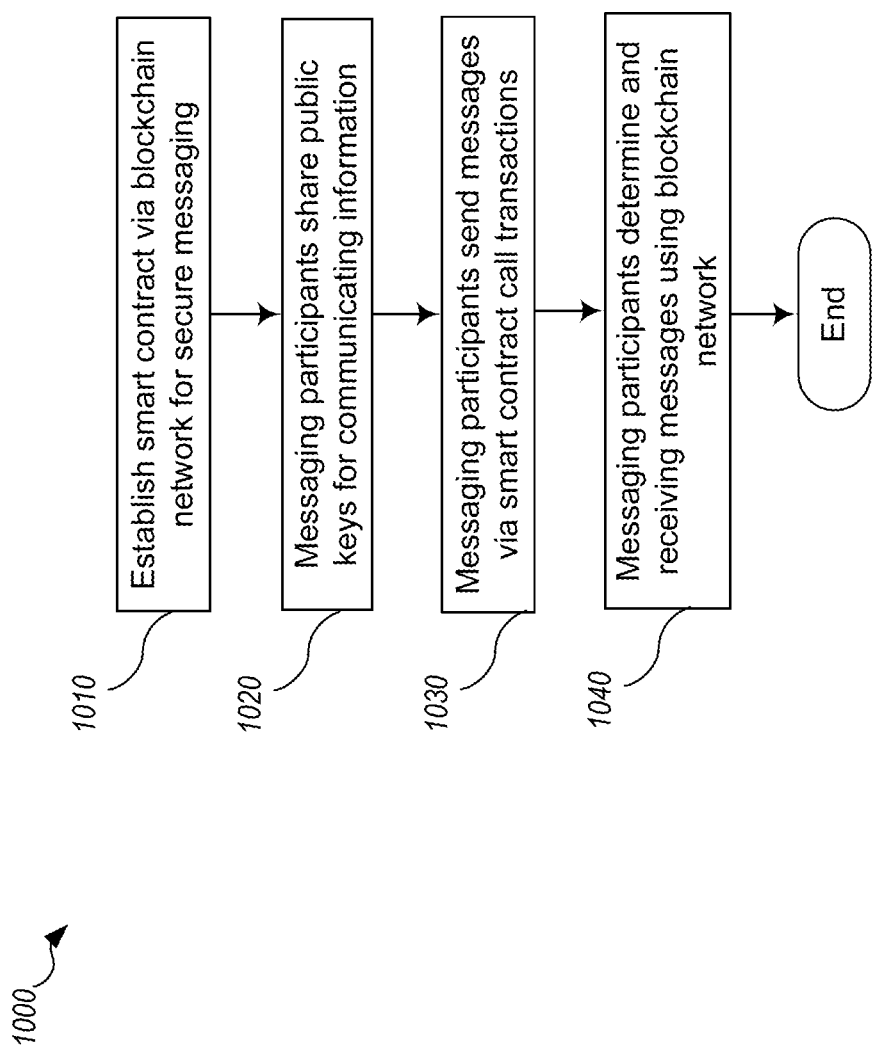
FIG. 10 is a flow chart illustrating an example method for communicating via a smart contract-based secure message bus, in accordance with some embodiments.

Another aspect of the presently disclosed technology addresses these issues via a smart contract that serves as a secure message bus between client(s), server(s), or other entities. FIG. 10 is a flow chart illustrating an example method 1000 for communicating via a smart contract-based secure message bus, in accordance with some embodiments. The method can be performed, at least in part, by entities (e.g., an application or application context, a service platform or system, or other sender or receiver entity) connected to a blockchain network that maintains, implements, or otherwise operates a bus-master smart contract.

The method 1000 starts at block 1010, where the bus-master smart contract is established. The bus-master smart contract operates on a blockchain network with a known identity (e.g., blockchain address of the smart contract) and exposes an interface for the creation and modification of a number of message bus object instances. These message bus instances can be uniquely identified by a name and a logical address for direct addressing through the bus-master smart contract.

At block 1020, the method 1000 includes messaging participants sharing their associated public keys for communicating information via the bus-master smart contract. In some embodiments, a messaging participant is an external actor that operates against a message bus instance by sending messages, receiving messages, publishing events, or listening for events. In some embodiments, a messaging participant may be a process running in an application context, a sender entity, a receiver entity, or other known entity.

Individual messaging participants (e.g., the browser actor as described above) can maintain their respective root cryptographic identities for use in message bus operations that generates RSA/DH or ECDSA/ECDH keys for asymmetric encryption, AES keys for symmetric encryption, and ECDSA keys for blockchain address derivation and digital signatures. When executing smart contract calls against the message bus, a participant can use a derived blockchain address as its "masquerade identity" on the bus. Authenticity of messages linked to a particular masquerade identity can be enforced by the corresponding blockchain network or platform using ECDSA digital signatures corresponding to the masquerade identity. The masquerade identity can be short or long-lived depending on use case, and new masquerade identities for use on the message bus can be derived at any time. Thus, a messaging participant's true identify is not shared with or otherwise provided to other messaging participant(s) for communication via the message bus.

A messaging participant (e.g., a recipient) can proactively announce or otherwise provide an association between its masquerade identity and RSA/ECDSA public key, e.g., by publishing it to the message bus, allowing another messaging participant (e.g., a sender) to derive a symmetric AES key for encryption of message payloads non-interactively (e.g., without user interaction). If the public key is not known for a recipient, a sender can interactively obtain the recipient's public key, e.g., by sending a message to the recipient requesting its public key and awaiting a response message to the sender from the recipient that contains its public key.

At block 1030, the method 1000 includes messaging participants sending messages by submitting bus-master smart contract call transactions. In some embodiments, this includes encrypting data payload using asymmetric encryption, and "tagging" the message with relevant topics and/or identifiers.

In some embodiments, a sender seeking to send a message to a known recipient submits a smart contract call against the message bus that specifies the recipient's masquerade identity (or address) and includes a message payload. Various suitable key derivation schemes can allow both sides to derive encryption keys for the payload, e.g., using their own private key and the other side's public key. In some embodiments, the message payload is encrypted with a securely derived AES key using DH/ECDH based on the RSA/ECDSA public key of the recipient and a corresponding RSA/ECDSA private key of the sender. This derived AES key can only be derived by the sender or receiver. In some embodiments, a sender can use either its identity keypair (which is used to sign transactions on the blockchain) or an ephemeral, freshly-generated keypair for each message, part of which can be included in the message to facilitate the recipient's ability to derive the encryption key. In another aspect, if the sender is unknown to the recipient, the sender can include its public key with its message so that the recipient can derive the decryption key for the message payload.

One-to-many, many-to-many, and publish-subscribe communication patterns can be achieved by sending messages to "audiences" or "topics." A new audience may be announced or otherwise established, e.g., by publishing it (e.g., including one or more corresponding masquerade identities and public keys) to the message bus. On creation, an audience can be configured as public, allowing anyone to join the audience, or private, requiring knowledge of a pre-shared key to join. Messages to a private audience can be encrypted using a key shared with members of the private audience.

A new topic can be announced or otherwise established, e.g., by publishing it (e.g., including one or more corresponding masquerade identities and public keys) to the message bus. On creation, a topic can be configured to accept messages from a defined audience or a defined list of senders ("permissioned topic") or open for any sender to address the topic ("unpermissioned topic"). A permissioned topic can also be configured as a private topic ("permissioned private topic") whose messages are encrypted for a specific audience. Unpermissioned topics are public by default ("unpermissioned public topic"), meaning that any sender can send messages to the topic and all payloads are unencrypted.

At block 1040, the method 1000 includes messaging participants determining and receiving messages, e.g., that are intended to be received by them, or those that they are interested in. This can be achieved, e.g., through filtering based on relevant topics or identifiers.

In some embodiments, all messages sent from messaging participants are ordered and time-stamped and remain perennially available through the distributed ledger operated by the blockchain network. Messaging participants can observe messages in real-time or can operate in an offline mode ("offline receipt"), whereby any number of historical messages and events can be retrieved by polling the blockchain network (e.g., via one or more nodes of the blockchain network) for a list of all transactions that have occurred since the last time the messaging participant was updated.

Real-time messaging participants can subscribe to new transaction notifications from the blockchain network and receive messages and events as new transactions are committed to the distributed ledger. Messaging participants can also operate in a "super-real-time" mode suitable for latency-sensitive applications. In some embodiments, messaging participants in super-real-time mode can directly monitor the in-memory transaction pool of pending transactions and search them locally to find messages of interest. For example, messaging participants can query or otherwise access one or more transaction pools or mem pools maintained by one or more nodes of the blockchain network. This mode bypasses the time necessary for a transaction to be committed to the ledger ("network consensus") before observing a message or event, and limits send-receive latency to the time required for a sender to place a transaction into an in-memory pool over a network RPC and a recipient to subsequently lookup the pending transaction from the in-memory pool over a network RPC, making it latency competitive with other real-time message bus systems. In some embodiments, a sender and recipient both operating in super-real-time mode can elect to bypass the need for transactions to be added to the distributed ledger (e.g., removing the corresponding message transactions from the in-memory pool before network consensus), thus avoiding all associated blockchain network "gas fees" in return for not having a retained historical log of messages and events.

The following is a description of a use case example where this other aspect of the technology can be used. Referring now to FIG. 1, in some embodiments, the browser-based enhancement for smart contract call system and method is used to launch anonymous burner desktops. Implementations of the browser-based enhancement for smart contract call system and method may be used to launch a burner desktop anywhere in the world and by accesses from a home browser.

Figure 2:
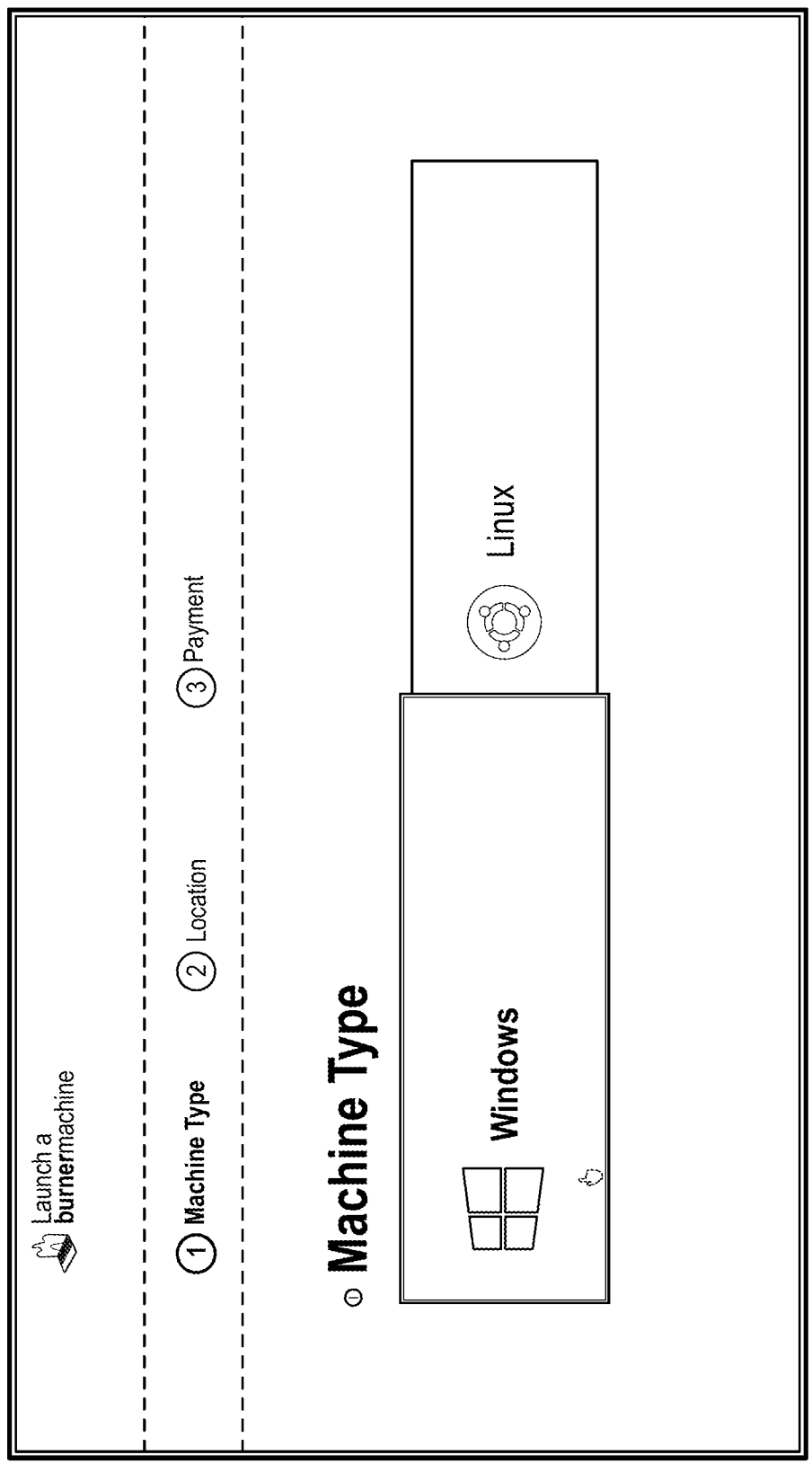
FIG. 2 is a screen shot of an anonymous burner machine launch page with a machine type selection in progress, according to the invention as described herein.
Figure 3:
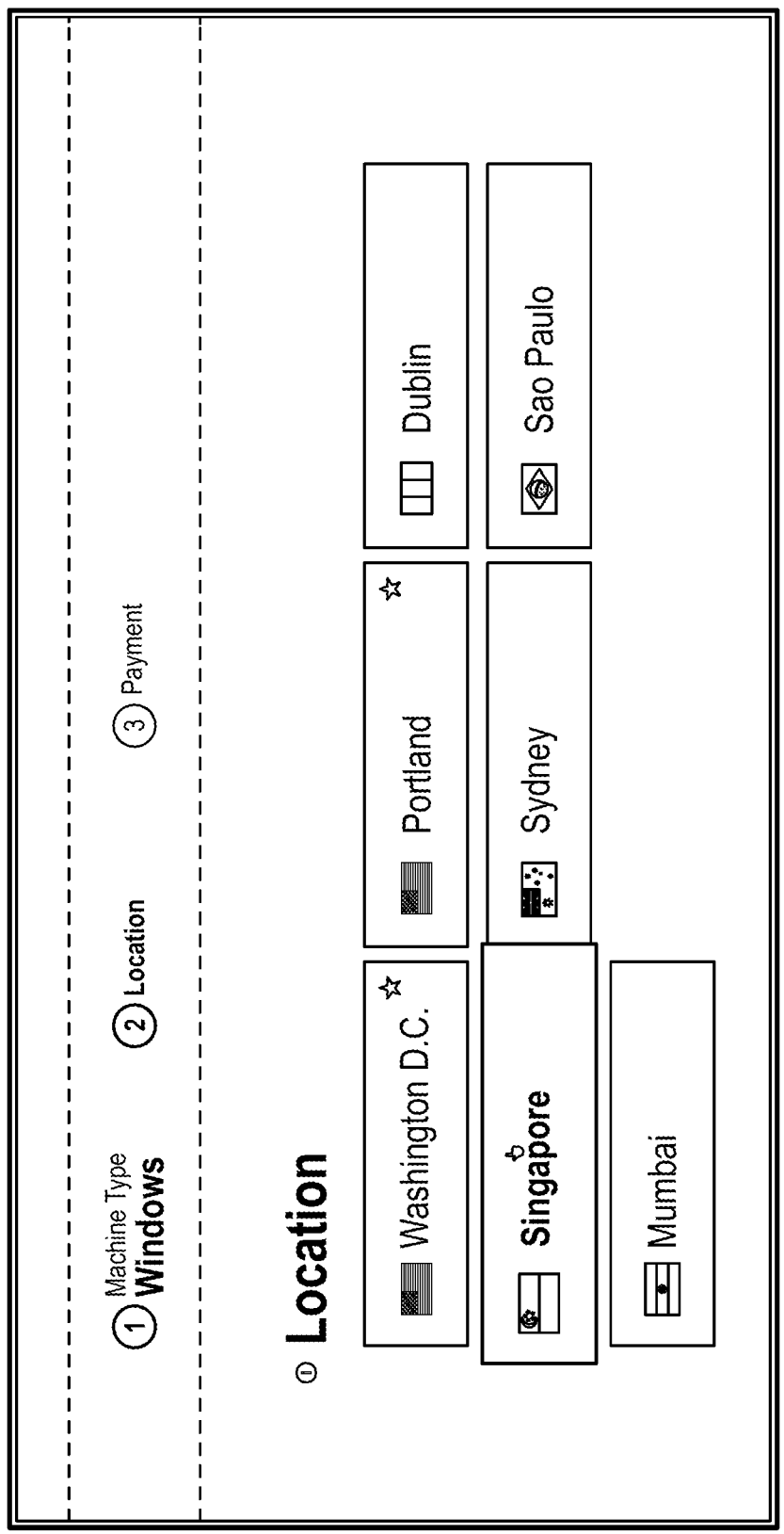
FIG. 3 is a screen shot of an anonymous burner machine launch page with a location selection in progress, according to the invention as described herein.
Figure 4:
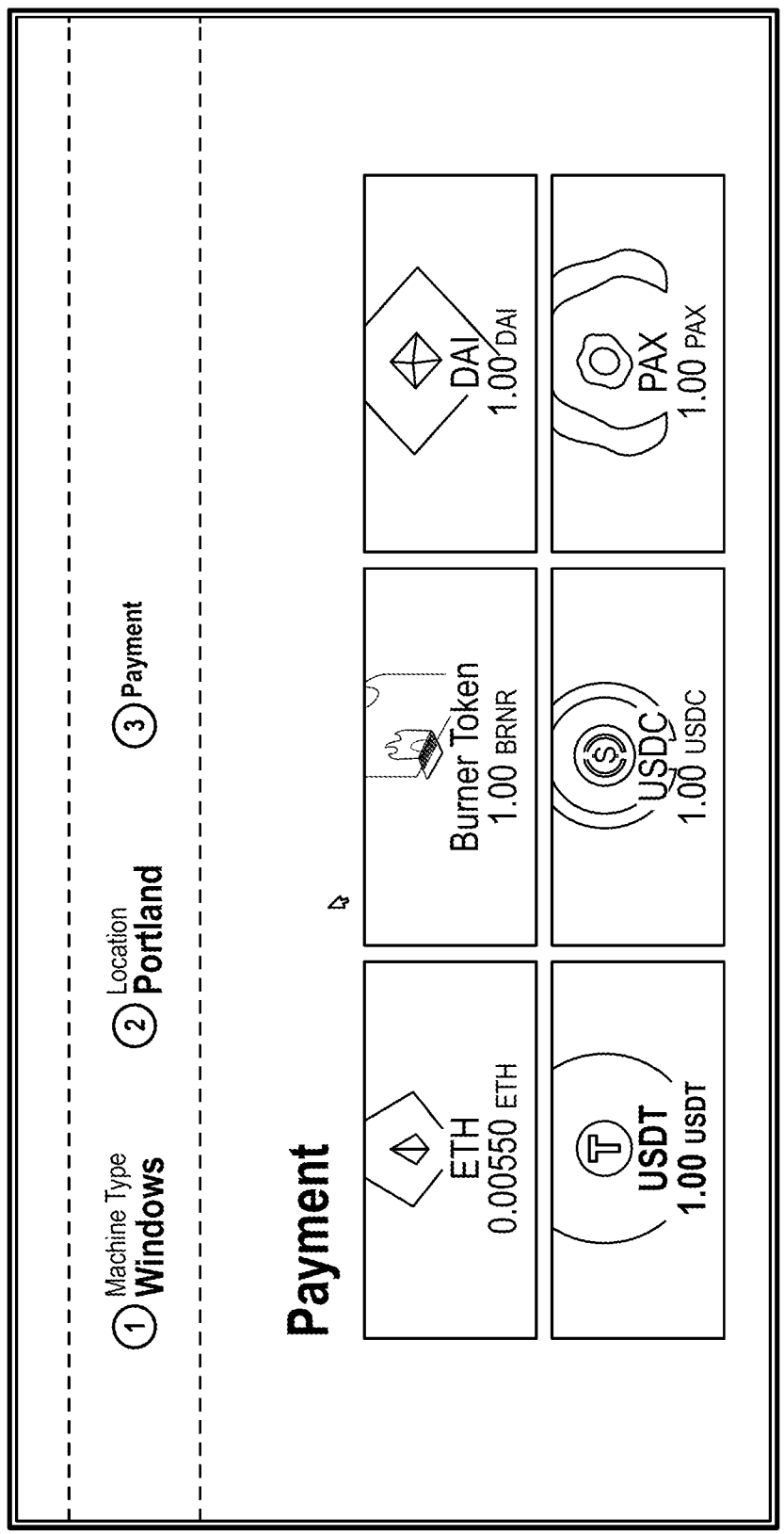
FIG. 4 is a screen shot of an anonymous burner machine launch page with a payment selection in progress, according to the invention as described herein.

In some embodiments, the browser-based enhancement for smart contract call method enables a browser to redeem a token without any dependencies from a burner machine launch platform using blockchain. As shown in FIG. 2, in this method, the burner machine launch platform receives a request for a burner machine from a first browser. Notably, the request includes a type of burner machine, such as Windows, Linux, and the like. As shown in FIG. 3, the burner machine launch platform receives a request for a burner machine location (e.g., location where the burner machine will be connected). Significantly, cryptocurrency may be used for funding the launch and rental of the burner machine, as shown in FIG. 4. For example, a crypto token is used as the payment or funding method. The funding measure could be Bitcoin, Ethereum, ERC-20 Tokens, and the like.

Continuing in this method, the burner machine launch platform receives a seed phrase from the first browser to derive a private key, as shown in FIGS. 5 and 6. A seed phrase is a list of words which store all the information needed to recover Bitcoin funds on-chain. Next in this method, the burner machine launch platform enables the private key to access a token that is associated with the seed phrase. The burner machine launch platform then enables the first browser to make a smart contract call by redeeming the token. Notably, when the first browser requests a burner machine, the request includes parameters of the requested burner machine.

Figure 7:
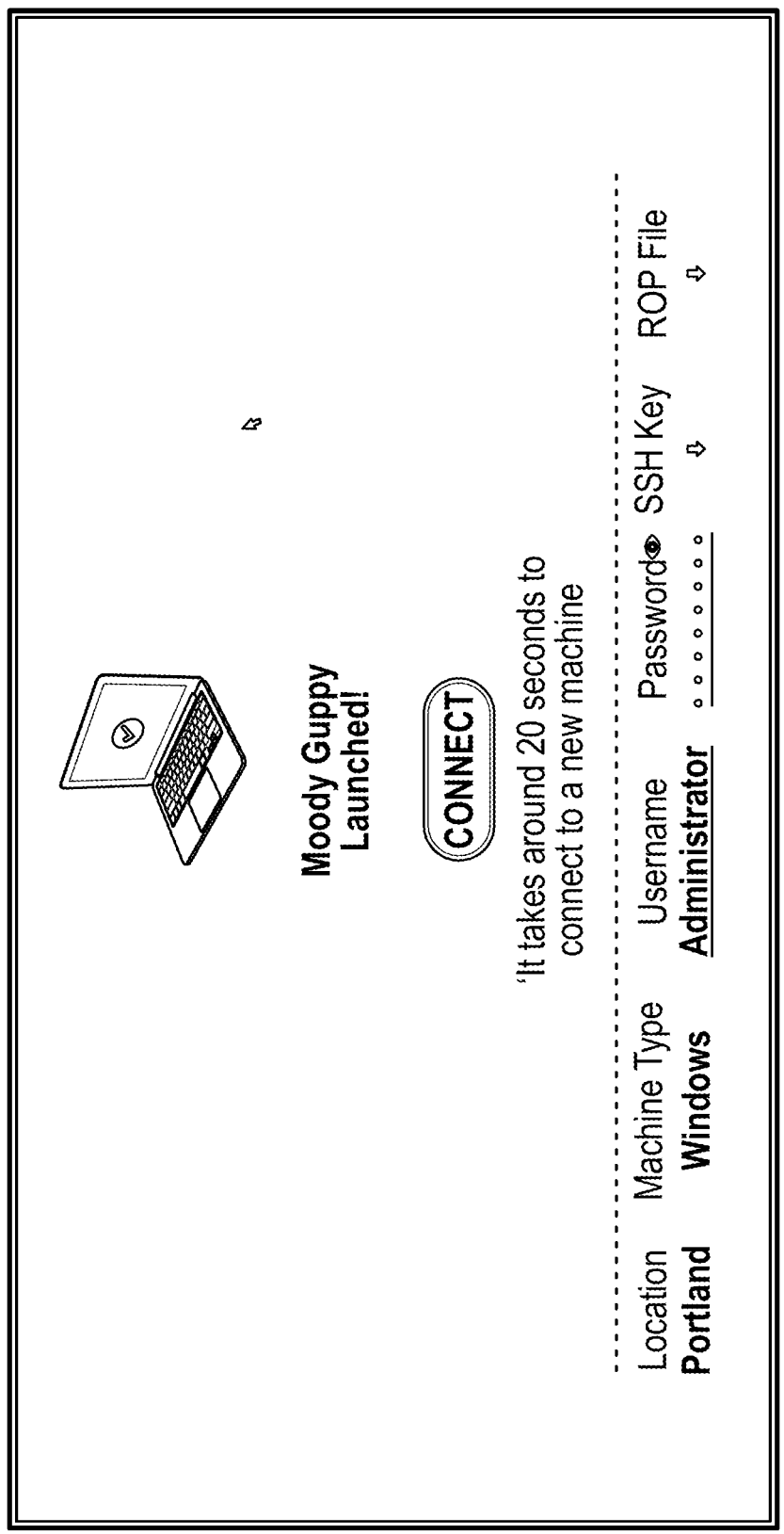
FIG. 7 is a screen shot of a burner machine launching, according to the invention as described herein.
Figure 8:
FIG. 8 is a screen shot of a desktop on a launched burner machine, according to the invention as described herein.

This method can include utilization of the method 1000 as describe above. In some embodiments, the first browser creates a set of ephemeral RSA keys that are used to encrypt information communicated between the browser and the burner machine launch platform. The burner machine launch platform sends communications to the first browser that are only directed to the first browser (i.e., the communication are not additionally directed to any other browsers). The communications are encrypted, and can only by decrypted by the ephemeral RSA keys of the first browser. This method is then completed by the burner machine launch platform launching a burner machine for the first browser, as shown in FIGS. 7 and 8. Significantly, the first browser redeems the token without any dependencies.

As described above, the first browser creates a throw away set of ephemeral RSA keys that are used to encrypt the information that is sent back to it. When the browser communicates with the burner machine launch platform, the burner machine launch platform sends a communication to first browser that is only for the first browser. The first browser decrypts this communication from the burner machine launch platform using the ephemeral RSA keys. Significantly, this entire burner machine launching transaction takes place without the burner machine launch platform ever knowing the identity of the first browser or its user, thus maintaining full privacy. There is no exchange of IP addresses. This communication is achieved using an opaque blob that is sent through the blockchain and is encrypted with a key that is only possessed by the burner machine launch platform. Opaque blob refer to a large piece of data, which looks like garbage from the outside, by entities which do not know what that blob denotes or carries, but makes sense to entities which have access permission and access functions to them. A burner machine is launched through this connection.

Embodiments of the browser-based enhancement for smart contract call system and method protect a user's privacy by creating a disposable virtual desktop just for the user in the cloud. A user may utilize a disposable virtual desktop just like any computer, except that all of the user's interactions are completely anonymous. In some embodiments, the disposable virtual desktop automatically self-terminates after a set period of time, e.g., three hours. The disposable virtual desktop (i.e., burner machine) created by the browser-based enhancement for smart contract call system and method delivers a consistent and pleasant experience across all major desktop browsers (e.g., Chrome, Firefox, Safari, Brave, Tor Browser, and Edge), as well as access Onion services and blocked sites using Tor. Some embodiments of the browser-based enhancement for smart contract call system and method use cryptocurrencies with installed Electrum, Wasabi, MyMonero, MetaMask, or MyCrypto wallets. Additionally, the browser-based enhancement for smart contract call system and method may enable users to securely message friends and colleagues using desktop apps like Signal or Telegram. Burner Machines launched by the browser-based enhancement for smart contract call system and method come with a quad-core CPU, 8 GB of RAM, a 30 GB SSD, and gigabit internet.

A burner machine may be accessed from any browser by connecting to the browser-based enhancement for smart contract call system and method. A user may also connect using the Remote Desktop Protocol (RDP) or Secure Shell (SSH) client of the user's choice by downloading a provided RDP connection file or SSH key. All sensitive information is encrypted with a key generated locally in a user's browser, which can easily be destroyed by the user clearing his or her cache. The browser-based enhancement for smart contract call system and method launches a cloud desktop on-demand that you can access from your browser that is powered by the blockchain and accepts payment in cryptocurrency.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

In some embodiments, a blockchain is a data structure that stores transactions in a way that the transactions are immutable. Thus, the recording of transactions on a blockchain is reliable and trustworthy. A blockchain includes one or more blocks. In some embodiments, each block in the chain is linked to a previous block immediately before it in the chain by including a cryptographic hash of the previous block; each block also includes a timestamp, its own cryptographic hash, and one or more transactions. In some embodiments, within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying, and validating transactions, etc. A blockchain network can be provided as a public blockchain network, a private blockchain network, or a consortium blockchain network. Embodiments of this specification can be realized in any appropriate type of blockchain network.

Figure 11:
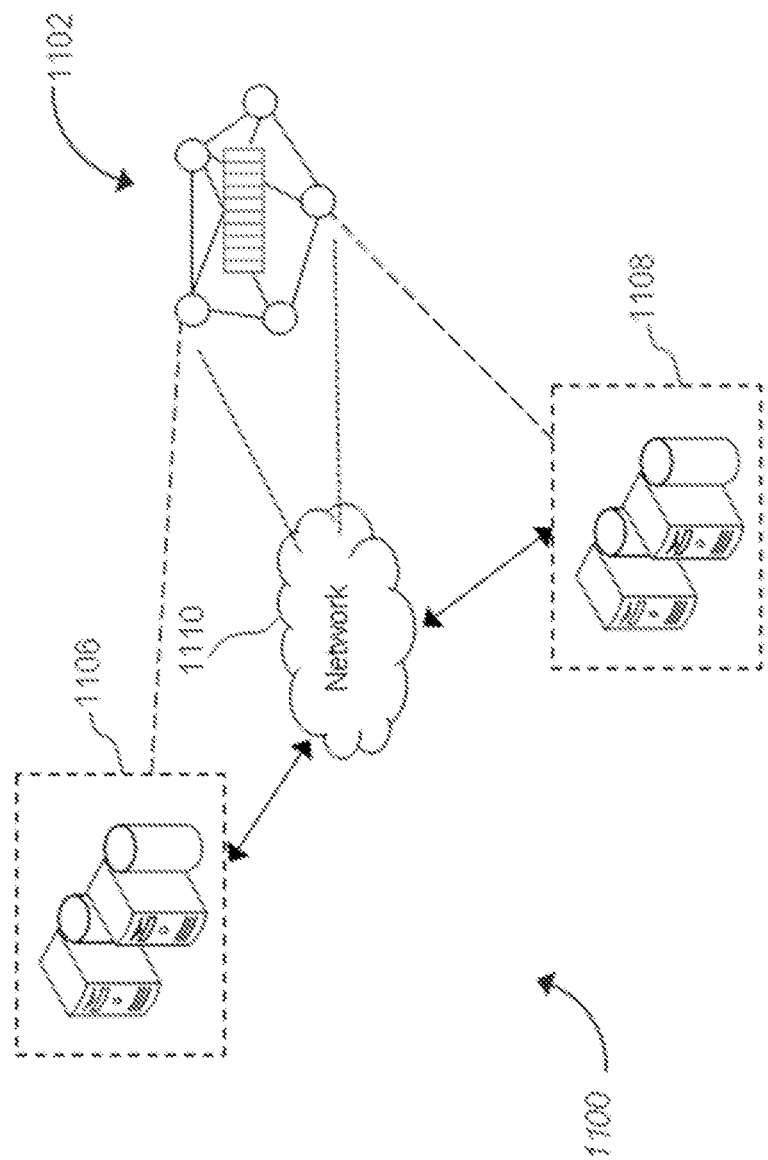
FIG. 11 is a diagram illustrating an example of an environment that can be used to execute embodiments of this specification.

FIG. 11 is a diagram illustrating an example of an environment 1100 that can be used to execute embodiments of this specification. In some examples, the environment 1100 enables entities to participate in a blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, each of the computing devices 1106, 1108 can be a separate and independent computing device or system, an individual node of a cloud computing system (not shown), or a separate cloud computing system including a number of computers interconnected by a network and functioning as a distributed processing system.

In the depicted example, the computing devices 1106, 1108 can each include any appropriate computing system that enables communication with one or more nodes, or participation as a node, in the blockchain network 1102. Examples of computing devices include, without limitation, a server, a desktop computer, a laptop computer, a tablet computing device, and a smartphone. In some examples, the computing devices 1106, 1108 host one or more computer-implemented applications or services for interacting with the blockchain network 1102. For example, the computing system 1106 can execute one or more computer-implemented applications of a first entity or first user, such as a web browser described herein or other network browsing applications; the computing device 1108 can host one or more computer-implemented services of a second entity or second user, such as a burner machine launch platform or other service platforms or system. In some embodiments, there may or may not be a network path for data connection between computing devices 1106 and 1108 via network 1110; each of computing devices 1106, 1108 communicates data with one or more nodes of the blockchain network 1102 corresponding network path(s), e.g., via network 1110.

Figure 12:
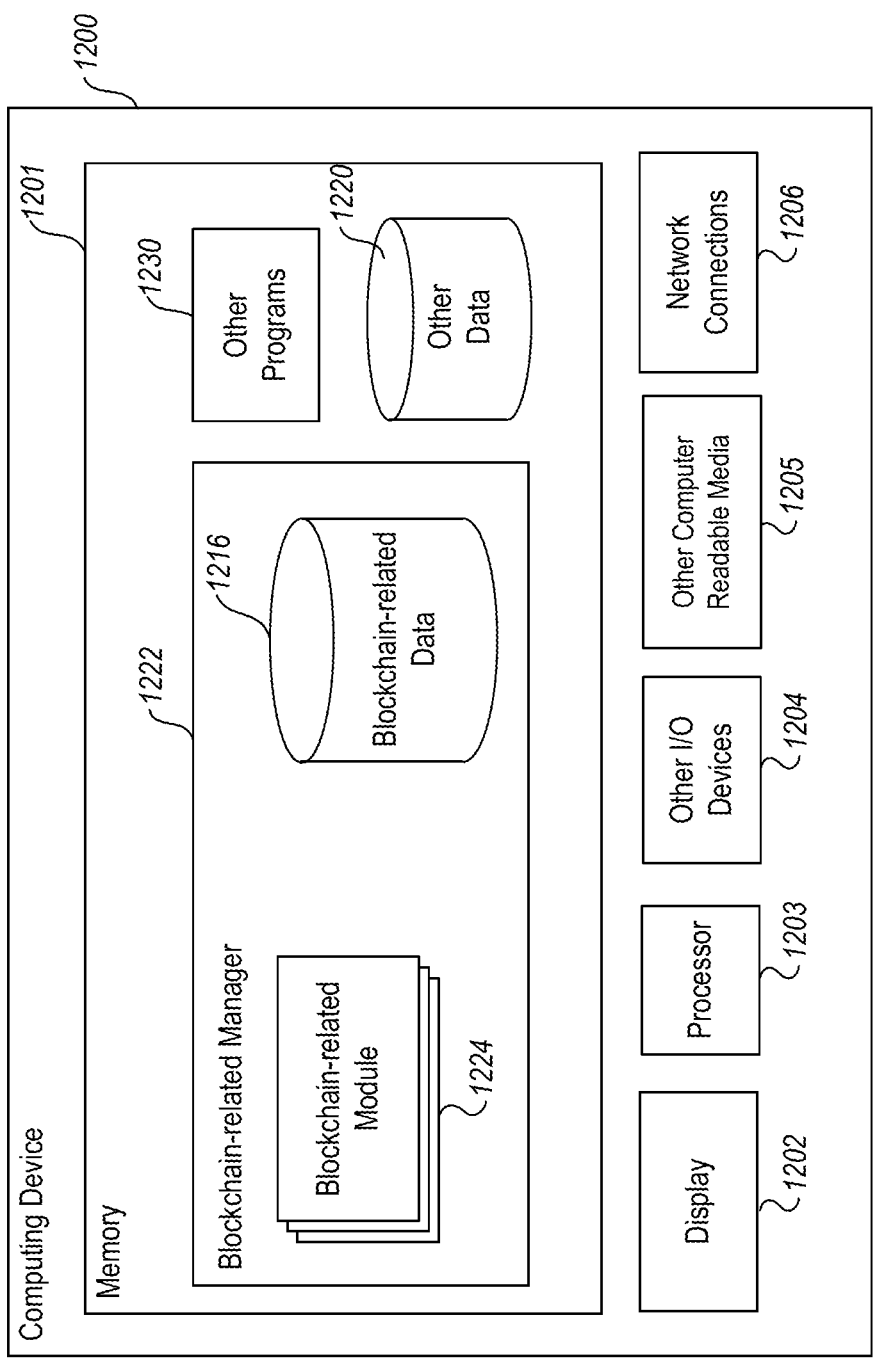
FIG. 12 is a block diagram illustrating elements of an example computing device utilized in accordance with at least some embodiments of the techniques described herein.

FIG. 12 is a block diagram illustrating elements of an example computing device 1200 utilized in accordance with at least some embodiments of the techniques described herein. In one or more embodiments, the computing device 1200 corresponds to one of the computing devices 1106, 1108, or at least a part thereof.

In some embodiments, one or more general purpose or special purpose computing systems or devices may be used to implement the computing device 1200. In addition, in some embodiments, the computing device 1200 may comprise one or more distinct computing systems or devices, and may span distributed locations. Furthermore, each block shown in FIG. 12 may represent one or more such blocks as appropriate to a specific embodiment or may be combined with other blocks. Also, the blockchain-related manager 1222 may be implemented in software, hardware, firmware, or in some combination to achieve the capabilities described herein.

As shown, in some embodiments, the computing device 1200 comprises a non-transitory computer memory ("memory") 1201, a display 1202 (including, but not limited to a light emitting diode (LED) panel, cathode ray tube (CRT) display, liquid crystal display (LCD), touch screen display, projector, etc.), one or more CPUs, GPUs, or other processors 1203, Input/Output ("I/O") devices 1204 (e.g., keyboard, mouse, RF or infrared receiver, universal serial bus (USB) ports, High-Definition Multimedia Interface (HDMI) ports, other communication ports, and the like), other computer-readable media 1205, and network connections 1206. The blockchain-related manager 1222 is shown residing in memory 1201. In other embodiments, some portion of the contents and some, or all, of the components of the blockchain-related manager 1222 may be stored on or transmitted over the other computer-readable media 1205. The components of the computing device 1200 and blockchain-related manager 1222 can execute on one or more processors 1203 and implement applicable functions described herein. In some embodiments, the blockchain-related manager 1222 may operate as, be part of, or work in conjunction or cooperation with other software applications stored in memory 1201 or on various other computing devices. In some embodiments, the blockchain-related manager 1222 also facilitates communication with peripheral devices via the I/O devices 1204, or with another device or system via the network connections 1206.

The one or more blockchain-related modules 1224 are configured to perform actions related, directly or indirectly, to the various functions described herein. In some embodiments, the blockchain-related module(s) 1224 stores, retrieves, or otherwise accesses at least some blockchain-related data on some portion of the blockchain-related data storage 1216 or other data storage internal or external to the computing device 1200.

Other code or programs 1230 (e.g., further data processing modules, program manager modules, Web servers, and the like), and potentially other data repositories, such as data repository 1220 for storing other data, may also reside in the memory 1201, and can execute on one or more processors 1203. Of note, one or more of the components in FIG. 12 may or may not be present in any specific implementation. For example, some embodiments may not provide other computer readable media 1205 or a display 1202.

In some embodiments, the computing device 1200 and blockchain-related manager 1222 include API(s) that provides programmatic access to add, remove, or change one or more functions of the computing device 1200. In some embodiments, components/modules of the computing device 1200 and blockchain-related manager 1222 are implemented using standard programming techniques. For example, the blockchain-related manager 1222 may be implemented as an executable running on the processor(s) 1203, along with one or more static or dynamic libraries. In other embodiments, the computing device 1200 and blockchain-related manager 1222 may be implemented as instructions processed by a virtual machine that executes as one of the other programs 1230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 1200 to perform the functions of the blockchain-related manager 1222. In some embodiments, instructions cause the processor(s) 1203 or some other processor, such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a blockchain-related manager 1222 implementation. Also, other functions could be implemented or performed by each component/module, and in different orders, and by different components/modules, yet still achieve the functions of the computing device 1200 and blockchain-related manager 1222.

In addition, programming interfaces to the data stored as part of the computing device 1200 and blockchain-related manager 1222, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The blockchain-related data storage 1216 and data repository 1220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the blockchain-related manager 1222.

Furthermore, in some embodiments, some or all of the components of the computing device 1200 and blockchain-related manager 1222 may be implemented or provided in other manners, such as at least partially in firmware or hardware, including, but not limited to one or more application-specific integrated circuits ("ASICs"), standard integrated circuits, controllers (e.g., by executing appropriate instructions, and including microcontrollers or embedded controllers), field-programmable gate arrays ("FPGAs"), complex programmable logic devices ("CPLDs"), and the like. Some or all of the system components or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for secure, anonymized messaging via a blockchain network that implements a message-bus smart contract, comprising:
   sharing among a plurality of messaging participants, by each messaging participant of the plurality of messaging participants, one or more public keys associated with the messaging participant, for communicating information using the message-bus smart contract wherein the plurality of messaging participants are external actors that operate against the message-bus smart contract;
   anonymously sending, by a first messaging participant of the plurality of messaging participants, a message that is at least in part encrypted based on a public key of a second messaging participant of the plurality of messaging participants, via a smart contract call from the first messaging participant against one of a plurality of instances of the message-bus smart contract that execute on the blockchain network;
   filtering, by a second messaging participant, all messages sent via smart contract calls against the instances of the message-bus smart contract since a previous filtering by the second messaging participant, based on a masquerade identity of the second messaging participant; and
   anonymously receiving, by the second participant of the plurality of messaging participants, the message using the blockchain network.

2. The method of claim 1, wherein individual instances of the plurality of instances of the message-bus smart contract are uniquely addressable on the blockchain network.

3. The method of claim 1, wherein sharing the one or more public keys associated with the messaging participant comprises publishing to the message-bus smart contract an association between a masquerade identity of the messaging participant and the one or more public keys.

4. The method of claim 3, wherein the masquerade identity of the messaging participant is derived based, at least in part, on a root cryptographic identity of the messaging participant on the blockchain.

5. The method of claim 1, wherein the smart contract call indicates a masquerade identity of the second participant and includes a message payload.

6. The method of claim 5, wherein the message payload is encrypted based, at least in part, on a public key of the second participant and a private key of the first participant.

7. The method of claim 1, wherein sending the message via the smart contract call comprises sending the message to an audience or topic published to the message-bus smart contract and wherein the smart contract call indicates one or more masquerade identities associated with the audience or topic.

8. The method of claim 1, wherein receiving the message using the blockchain network comprises polling the blockchain network for transactions against the message-bus smart contract since the second messaging participant was last updated, and filtering the transactions based, at least in part, on a masquerade identity of the second participant.

9. A system, comprising:
   one or more processors; and
   a memory device storing instructions thereon that when executed by the one or more processors, cause one or more of the one or more processors to perform actions comprising:
      sharing among a plurality of messaging participants, by a recipient of the plurality of messaging participants, one or more public keys associated with the recipient, for communicating information using a message-bus smart contract implemented on a blockchain network, wherein the plurality of messaging participants are external actors that operate against the message-bus smart contract;
      filtering, by the recipient, all messages sent via smart contract calls against a plurality of instances of the message-bus smart contract since a previous filtering by the recipient, based on a masquerade identity of the recipient; and
      anonymously receiving, by the recipient and using the blockchain network, a message that is at least in part encrypted based on a public key of a sender of the plurality of messaging participants and sent via a smart contract call against one of the plurality of instances of the message-bus smart contract that execute on the blockchain network.

10. The system of claim 9, wherein sharing the one or more public keys associated with the recipient comprises publishing to the message-bus smart contract an association between a masquerade identity of the recipient and the one or more public keys.

11. The system of claim 10, wherein the masquerade identity of the recipient is derived based, at least in part, on a root cryptographic identity of the recipient on the blockchain.

12. The system of claim 9, wherein the smart contract call indicates a masquerade identity of the recipient and includes a message payload.

13. The system of claim 12, wherein the message payload is encrypted based, at least in part, on a public key of the recipient and a private key of the sender.

14. The system of claim 9, wherein the actions further comprise enabling, at least partially, the sender to anonymously direct the message to the recipient via the smart contract call.

15. The system of claim 9, wherein determining and receiving the message using the blockchain network comprises monitoring the blockchain network in real-time for transactions against the message-bus smart contract based, at least in part, on a masquerade identity of the recipient.

16. A non-transitory computer-readable medium storing contents that, when executed by one or more processors, cause the one or more processors to perform actions comprising:

sharing among a plurality of messaging participants, by a recipient of a plurality of messaging participants, one or more public keys associated with the recipient, for communicating information using a message-bus smart contract implemented on a blockchain network, wherein the plurality of messaging participants are external actors that operate against the message-bus smart contract;

filtering, by the recipient, all messages sent via smart contract calls against a plurality of instances of the message-bus smart contract since a previous filtering by the recipient, based on a masquerade identity of the recipient; and anonymously receiving, by the recipient and using the blockchain network, a message that is at least in part encrypted based on a public key of a sender of the plurality of messaging participants and sent via a smart contract call against one of the plurality of instances of the message-bus smart contract that execute on the blockchain network.

17. The computer-readable medium of claim 16, wherein sharing the one or more public keys associated with the recipient comprises publishing to the message-bus smart contract an association between a masquerade identity of the recipient and the one or more public keys.

18. The computer-readable medium of claim 16, wherein the smart contract call indicates a set of masquerade identities including the masquerade identity of the recipient.

19. The computer-readable medium of claim 16, wherein receiving the message using the blockchain network comprises polling the blockchain network for transactions against the message-bus smart contract.

20. The computer-readable medium of claim 19, wherein receiving the message using the blockchain network further comprises filtering the transactions based on one or more masquerade identities of an audience or topic published to the message-bus smart contract.

* * * * *

UNITED STATES PATENT AND TRADEMARK OFFICE
CERTIFICATE OF CORRECTION

| | | |
|---|---|---|
| PATENT NO. | : 11,838,277 B2 | Page 1 of 1 |
| APPLICATION NO. | : 17/515134 | |
| DATED | : December 5, 2023 | |
| INVENTOR(S) | : Lundgren et al. | |

It is certified that error appears in the above-identified patent and that said Letters Patent is hereby corrected as shown below:

In the Claims

<u>Column 17, Claim 1, Lines 39 and 40:</u>
"smart contract wherein"
Should read:
--smart contract, wherein--.

Signed and Sealed this
Fifteenth Day of April, 2025

Coke Morgan Stewart
*Acting Director of the United States Patent and Trademark Office*